United States Patent
Coutu et al.

(10) Patent No.: US 6,190,465 B1
(45) Date of Patent: Feb. 20, 2001

(54) SOFT MAGNETIC ALLOY OF THE FE-NI-CR-TI TYPE FOR A MAGNETIC CIRCUIT OF A HIGH-SENSITIVITY RELAY

(75) Inventors: Lucien Coutu, Sauvign-les-Bois; Laurent Chaput, Sauvigny-les-Bois; Thierry Waeckerle, Nevers, all of (FR)

(73) Assignee: Imphy Ugine Precision, Puteaux (FR)

(*) Notice: Under 35 U.S.C. 154(b), the term of this patent shall be extended for 0 days.

(21) Appl. No.: 09/110,077

(22) Filed: Jul. 2, 1998

(30) Foreign Application Priority Data

Jul. 4, 1997 (FR) .................................................. 97 08448

(51) Int. Cl.$^7$ .................................................... H01F 1/147
(52) U.S. Cl. .......................... 148/315; 148/310; 148/311; 148/312; 148/120; 148/121; 420/446; 420/451; 420/452; 420/583
(58) Field of Search .................................... 148/310, 311, 148/312, 315, 120, 121; 420/446, 451, 452, 583

(56) References Cited

U.S. PATENT DOCUMENTS

| 4,006,012 | * | 2/1977 | Kindlimann . |
| 4,572,750 | * | 2/1986 | Masumoto et al. . |
| 5,340,413 | * | 8/1994 | Martis .................... 148/305 |

FOREIGN PATENT DOCUMENTS

| 0 505 595 | 9/1992 | (EP) . |
| 0 640 895 | 3/1995 | (EP) . |
| 0 740 313 | 10/1996 | (EP) . |
| 54-3294 | 1/1979 | (JP) . |

OTHER PUBLICATIONS

Chemical Abstracts, vol. 90, No. 20; Momose Et Al; "Soft Magnetic Materials"; Abstract No. 16123f; p. 604, XP002053525 May 1979.

H. Eriksson Et Al; "50 Permalloy Alloyed With Cr for Increased Corrosion Resistance"; IEEE Transactions on Magnetics; vol. 13, No. 5, Sep. 1977, pp. 1451–1452, XP002053524.

* cited by examiner

*Primary Examiner*—John Sheehan
(74) *Attorney, Agent, or Firm*—Oblon, Spivak, McClelland, Maier & Neustadt, P.C.

(57) ABSTRACT

Soft magnetic alloy of the iron-nickel type, the chemical composition of which comprises, by weight: $40\% \leq Ni+Co \leq 65\%$; $0\% \leq Co \leq 7\%$; $2\% \leq Cr \leq 5\%$; $1\% \leq Ti \leq 3\%$; $0\% \leq Al \leq 0.5\%$; $0\% \leq Mn+Si \leq 2\%$; optionally, up to 3% Mo, 2% W, 2% V, 1.5% Nb, 1% Ta and 3% Cu, the sum of the Cr, Mo, W, V, Nb, Ta and Cu contents being less than 7% and the sum of the Mo, W, V, Nb, Ta and Cu contents being less than 4%; the balance being iron and impurities, such as carbon, sulfur and phosphorus, resulting from the smelting process, the chemical composition furthermore satisfying the relationships: $Cr < 5 - 0.015 \times (Ni+Co-52.5)^2$, if: $Ni+Co \leq 52.5$; $Cr < 5 - 0.040 \times (Ni+Co-52.5)^2$, if: $Ni+Co \geq 52.5$; the alloy having a saturation induction Bs of greater than 0.9 tesla, a coercive field of less than 10 A/m, an electrical resistivity p of greater than 60 $\mu\Omega$.cm and a hardness of greater than 200 HV. Process for manufacturing the alloy and uses.

9 Claims, No Drawings

SOFT MAGNETIC ALLOY OF THE FE-NI-CR-TI TYPE FOR A MAGNETIC CIRCUIT OF A HIGH-SENSITIVITY RELAY

BACKGROUND OF THE INVENTION

FIELD OF THE INVENTION

The invention relates to a soft magnetic alloy having good magnetic properties and, at the same time a good hardness and good corrosion resistance. This alloy is useful generally, and is particularly suitable for the manufacture of the magnetic circuit of a relay of an own-current residual current device.

DISCUSSION OF THE BACKGROUND

Residual current devices are intended to ensure the safety of individuals by rapidly cutting off a main electrical circuit when a fault appears in the circuit. Several types of residual current devices exist, especially residual current devices of the so-called "own current" type. Own-current residual current devices consist of a current fault detector, a high-sensitivity relay, a trip and a mechanism for opening the main electrical circuit. When a fault appears in the main electrical circuit, the fault detector sends an electrical pulse to the high-sensitivity relay, which opens and actuates the trip, thereby setting into motion the mechanism for opening the main electrical circuit.

The high-sensitivity relay consists of a magnetic circuit, having a moving contact and a fixed U-shaped armature, of a return spring, of a permanent magnet and of a coil. The permanent magnet is placed beneath the lower bar of the U-shaped fixed armature and the coil surrounds one arm of the U. The moving contact lies on both ends of the arms of the U, and one of its ends is fixed to the return spring. When the relay is at rest, i.e. ready to be actuated, no current flows through the coil, the permanent magnet causes a continuous magnetic flux to circulate in the magnetic circuit, creating an attraction force which holds the moving contact against the fixed armature, and the return spring is under tension. When an alternating fault appears in the main electrical circuit, the fault detector sends an electric current into the coil of the relay. This current generates a magnetic field which demagnetizes the fixed armature, thereby decreasing the magnetic attraction force holding the moving contact against the fixed armature and causing the moving contact to tilt due to the effect of the tension in the return spring. By tilting, the moving contact actuates the trip.

In order for such a relay to operate properly, the magnetic circuit must be made of a soft magnetic alloy characterized by as high as possible a saturation induction, as low as possible a coercive field and a relatively high electrical resistivity. However, in order for the relay to operate reliably over a long period, it is also desirable, on the one hand, for the soft magnetic alloy to have good resistance to wet atmospheric corrosion in order to prevent the formation of oxides in the contact area between the moving contact and the fixed armature, and, on the other hand, for the hardness to be high enough to prevent local wear and deformation of the components which successive operations could cause.

In order to meet the desired magnetic-property conditions, the magnetic circuit is manufactured from a soft magnetic alloy of the iron-nickel type containing 48% nickel by weight, the balance being iron and impurities resulting from the smelting process. This alloy has the advantage of having a saturation induction Bs of 1.5 tesla and a coercive field Hc of 4 A/m, which corresponds to the best characteristics that can be obtained. However, this alloy has the drawback of having quite a low hardness (about 100 HV) and of having too low a corrosion resistance. In order to compensate for these insufficiencies, the magnetic circuit, or at least the moving contact, is protected by an anticorrosion coating (for example, by depositing gold) or by a hardening and corrosion-resistant coating, for example by depositing chromium. However, this technique has the drawback of being expensive and of creating, in the contact area between the moving contact and the armature, an additional thickness which detracts from the magnetic behavior of the magnetic circuit taken in its entirety because of an air-gap effect and of residual stresses.

In order to remedy the hardness problem, it has been proposed, especially in European Patent Application EP 0 740, 313, to use, for this purpose, a soft magnetic alloy of the iron-nickel-titanium type containing, by weight, 46 to 46.5% nickel, approximately 1.8% titanium, from 0% to 1% niobium, from 0.45% to 0.5% manganese and from 0.25% to 0.45% silicon, the balance being iron and impurities resulting from the smelting process. This alloy has the advantage of having a saturation induction of 1.35 tesla and a hardness greater 220 HV. However, it has the drawback of having a coercive field Hc of 10 A/m, which is relatively high, and in addition, it has a somewhat insufficient corrosion resistance.

OBJECTS OF THE INVENTION

None of the known alloys is therefore completely satisfactory, and therefore one object of the present invention is to remedy this drawback by providing a soft magnetic alloy which is well suited to the manufacture of the magnetic circuit of a high-sensitivity relay, having a saturation induction BS of greater than 0.9 tesla, a coercive field HC of substantially less than 10 A/m, an electrical resistivity p of greater than 60 $\mu\Omega$.cm, a hardness of greater than 200 HV, and good resistance to atmospheric corrosion.

SUMMARY OF THE INVENTION

For this purpose, the subject of the invention is a soft magnetic alloy of the iron-nickel type, whose chemical composition comprises, by weight based on total weight:

40%$\leq$Ni+Co$\leq$65%
0%$\leq$Co$\leq$7%
2%$\leq$Cr$\leq$5%
1%$\leq$Ti$\leq$3%
0%$\leq$Al$\leq$0.5%
0% Mn$\leq$2%
0%$\leq$Si$\leq$1% optionally, up to 3% Mo, up to 2% W, up to 2% V, up to 1.5% Nb, up to 1% Ta and up to 3% Cu, the sum of the Cr, Mo, W, V, Nb, Ta and Cu contents being less than 7% and the sum of the Mo, W, V, Nb, Ta and Cu contents being less than 4%, the balance comprising or being iron and impurities, such as carbon, sulfur and phosphorus, resulting from the smelting process, the chemical composition furthermore satisfying the relationships:

Cr<5−0.015×(Ni+Co−52.5)$^2$ if: Ni+Co$\leq$52.5
Cr<5−0.040×(Ni+Co−52.5)$^2$ if: Ni+Co$\geq$52.5 the alloy having a saturation induction Bs of greater than 0.9 tesla, a coercive field of less than 10 A/m, an electrical resistivity p of greater than 60 $\mu\Omega$.cm and a hardness of greater than 200 HV.

Preferably, the chemical composition of the alloy is such that:

48%≤Ni+Co≤55%
0%≤Co≤3%
2%≤Cr≤4%
0%≤Mo+W+V+Nb+Ta+Cu≤1%
1.3%≤Ti≤1.7%
0.05%≤Al≤0.25%
0.1%≤Mn≤0.3%
0%≤Si≤0.1%.

And it is preferable for the impurities resulting from the smelting process to be such that:
C<0.01%
S<0.001%
P<0.01%.

Better still, the chemical composition of the alloy should be such that:
50%≤Ni+Co≤52%
0%≤Co≤3%
3%≤Cr≤4%
0%≤Mo+W+V+Nb+Ta+Cu≤0.5%
1.3%≤Ti≤1.7%
0.05%≤Al≤0.25%
0.1%≤Mn≤0.3%
0%≤Si≤0.1%.

In order to manufacture a strip or a component made of soft magnetic alloy according to the invention, it is preferable to anneal the strip, or the component, at high temperature, namely between 1000° C. and 1175° C., for 2 to 6 hours and for it to be tempered at a temperature of between 650° C. and 750° C. for 1 to 5 hours.

The invention also relates to a high-sensitivity relay, and especially a relay for an own-current residual current device, of the type comprising a magnetic circuit consisting of a moving contact and a fixed armature, in which the moving contact or the fixed armature, or both of them, are made of a soft magnetic alloy according to the invention.

The soft magnetic alloy may also be advantageously used for the manufacture of certain types of small electric motors or generators, such as a motor for an electric watch with hands. This is because, in this application, the desired magnetic properties are very comparable and the problem of corrosion resistance arises in a similar fashion.

More generally, the invention soft magnetic alloy may advantageously be used for any application in which the soft magnetic alloy is subjected to severe chemical or mechanical stresses, either during manufacture and assembly of the components, or during use. These components are, for example, electromagnets, special magnetic screens, stepper motors, synchro-resolvers, vibrating reeds and membranes driven by electromagnets, actuators or activators of various types.

DESCRIPTION OF THE PREFERRED EMBODIMENTS

The invention will now be described in a more specific, but non-limiting, manner and illustrated by an example.

The alloy according to the invention is an alloy of the iron-nickel type containing, by weight:

from 40% to 65% nickel, part of which may be substituted, up to a level of 7% by cobalt; preferably, the nickel content (or the sum of Ni+Co) should be between 48% and 55%, and even better between 50% and 52%, in order to obtain a high saturation induction Bs; since cobalt is an expensive element, its content should preferably remain less than 3%, or even be zero, although it can, in some cases, improve certain magnetic properties;

from 2% to 5% chromium in order to improve the resistance to atmospheric corrosion; but, preferably, the chromium content should be between 3% and 4% so as, on the one hand, to obtain a sufficient corrosion resistance and, on the other hand, not to reduce the saturation induction Bs too much, this generally being preferred to be greater than 0.9 tesla;

from 1% to 3%, and preferably from 1.3% to 1.6% or even 1.7% titanium, together with 0% to 0.5%, and preferably 0.05% to 0.25%, aluminum in order to make it possible to obtain, by precipitation hardening, a hardness of greater than 200 HV; however, too high a titanium content, or too high a hardness (HV>300), would have a deleterious effect on the saturation induction and on the coercive field;

the balance comprising, preferably being, iron, optionally including alloying elements present in small quantities, a small amount of manganese and silicon, and impurities resulting from the smelting process.

The complementary alloying elements are, especially, molybdenum, tungsten, vanadium, niobium, tantalum and copper. These elements may be added in order to improve, for example, the oxidation resistance or the wear resistance. The contents of these elements should remain within the following limits: Mo≤3%, W≤2%, V≤2%, Nb≤1.5%, Ta≤1% and Cu≤3%. However, the total sum of the contents of each of these elements should remain less than 4%, preferably less than 1% and even better less than 0.5% in order not to decrease the saturation induction too much. In addition, the sum of Cr+Mo+W+V+Nb+Ta+Cu should remain less than 7%, for the same reasons.

Preferably, the sum of the manganese and silicon contents should be less than 2%. Manganese helps to improve the hot ductility, especially by fixing sulfur. Its content must be between 0% and 2%, and preferably between 0.1% and 0.3%, in order to avoid an excessive deterioration in the saturation induction. Silicon is of use when smelting the metal, but it is preferred to limit its content to 1%, preferably to 0.15% and even better to 0.1%, also in order to avoid excessive deterioration in the saturation induction.

The impurities include and are preferably limited to, in particular, carbon, sulfur and phosphorus. Their contents should remain very low and, in particular, it is preferable that:

the carbon content remain less than 0.01% in order not to impair the magnetic properties, the sulfur content remain less than 0.001% in order to improve the resistance to pitting corrosion, and the phosphorus content remain less than 0.01% in order not to impair the magnetic properties.

In addition, in order to ensure that the saturation induction Bs remains greater than 0.9 T, it is desirable for the Cr and Ni (or Ni+Co) contents to be such that:

$Cr<5-0.015\times(Ni+Co-52.5)^2$ if: Ni+Co≤52.5
$Cr<5-0.040\times(Ni+Co-52.5)^2$ if: Ni+Co≥52.5
where Cr<5 when Ni+Co=52.5

Moreover, the minimum titanium content for obtaining the desired hardness depends partly on the chromium content, and the titanium and chromium contents should preferably satisfy the relationship:

Ti≥1.8−0.1×Cr.

With regard to the chromium content, it has been found that from 2% to 3% of this element multiplied the corrosion resistance of the alloy by a factor of 2 (compared with an alloy which is identical elsewhere, but does not contain chromium) and that 5% multiplied the corrosion resistance by a factor of 4. It has also been observed that chromium had a strong effect on the electrical resistivity, which increased from approximately 5 to 10 $\mu\Omega$.cm for a 1% increase in the chromium content, for a chromium content of less than 5%.

The invention alloy with this composition can be smelted, for example by melting it in vacuo, and it is then cast in the form of an ingot and hot-rolled and cold-rolled in order to obtain a product, for example a thin strip from which components may be cut. In order to give the product, or the components, the desired service characteristics, a double heat treatment may be carried out: firstly, high-temperature annealing between 1000° C. and 1175° C., preferably above 1050° C. and even better still above 1100° C., for 2 to 6 hours in an atmosphere of dry pure hydrogen, in order to obtain good recrystallization, and secondly, low-temperature tempering, preferably between 650° C. and 750° C. for 1 to 5 hours, in order to harden the metal by precipitating the γ' ($Ni_3Ti$ or $Ni_3TiAl$) phase.

EXAMPLE

By way of example, an alloy was produced whose composition was, in % by weight:

| Ni | Cr | Mo | Ti | Al | Mn | Si | C | S | P | Fe |
|---|---|---|---|---|---|---|---|---|---|---|
| 50.10 | 3.30 | 0.5 | 1.45 | 0.24 | 0.21 | 0.02 | 0.008 | 0.0009 | 0.006 | bal |

A strip 1 mm in thickness was manufactured from this alloy by hot rolling and then cold rolling, the strip being treated at 1150° C. for 4 hours in an atmosphere of pure dry nitrogen and then being tempered at 725° C. for three hours, also in hydrogen. The properties obtained were:

saturation induction: Bs=1.03 tesla (measured with H=1000 A/m)

coercive field: Hc=4.8 A/m electrical resistivity: $\rho$=90 $\mu\Omega$.cm

Vickers hardness: HV=250.

In addition, an atmospheric-corrosion resistance test was carried out, which consists in immersing metal specimens in a solution of acetic acid diluted to 30% in water and in measuring the weight loss of the specimens after several hundred hours. This test was carried out on the FeNiCrTi alloy given in the example and in accordance with the invention and, by way of comparison, on an Ni48Fe alloy according to the prior art, the corrosion resistance of which is regarded as slightly insufficient. The test showed that the rate of etching of the alloy according to the invention is approximately three times less than that of the alloy according to the prior art.

These properties make the invention alloys particularly suitable for the manufacture of the U-shaped fixed armature and the moving contact of the magnetic circuit of a high-sensitivity relay for a residual current device. These two components are obtained by cutting them out from a softened strip 1.5 mm in thickness and then by forming them by folding. Next, the components are ground so as to obtain a perfect geometry of the areas of contact between the moving contact and the armature. Next, the double heat treatment, consisting of annealing at about 1150° C. followed by tempering at about 725° C., is carried out in a protective atmosphere so as not to oxidize the metal. In order to correct the small deformation of the components that is associated with the hardening operation (contraction by about 0.1%), the components may, if necessary, be reground slightly and then retempered at about 725° C. in order to restore the magnetic properties in the ground regions. Finally, the components are lightly honed in order to normalize the contact surfaces of the armature and the moving contact. The components thus obtained, having a good hardness and a good atmospheric-corrosion resistance, may be used as they are, without any additional surface treatment. In such a relay, only the moving contact or only the armature, or both components, may be made of an alloy according to the invention.

The alloy according to the invention has, at the same time, magnetic properties, a hardness and a corrosion resistance which make it advantageous for it to be used in many applications such as the magnetic components of small electric motors or generators. Such a motor is, for example, a motor for an electric watch with hands, of the type comprising a magnetic circuit consisting of a stator and of a coil core. The stator or the coil core, or both of them, may advantageously be made of a soft magnetic alloy according to the invention.

French patent application 97 08448 is incorporated herein by reference.

We claim:

1. A soft magnetic alloy consisting of, by weight based on total weight:

40%≦Ni+Co<61.16%

0%≦Co≦7%

2%≦Cr<5%

1%≦Ti≦3%

0%≦Al≦0.5%

0%≦Mn≦2%

0%≦Si≦1% iron and impurities resulting from smelting, and, optionally, up to 3% Mo, up to 2% W, up to 2% V, up to 1.5% Nb, up to 1% Ta and up to 3% Cu, the sum of the Cr, Mo, W, V, Nb, Ta and Cu contents being less than 7% and the sum of the Mo, W, V, Nb, Ta and Cu contents being less than 4%, the chemical composition furthermore satisfying the relationships:

Cr<5−0.015×(Ni+Co−52.5)$^2$ if: Ni+Co<52.5

Cr<5−0.040×(Ni+Co−52.5)$^2$ if: Ni+Co>52.5

Cr<5 when Ni+Co=52.5 the alloy having a saturation induction Bs of greater than 0.9 tesla, a coercive field of less than 10 A/m, an electrical resistivity $\rho$ of greater than 60 $\mu\Omega$.cm and a hardness of greater than 200 HV.

2. The soft magnetic alloy as claimed in claim 1, wherein:

48%≦Ni+Co≦55%

0%≦Co≦3%

3%≦Cr≦4%

0%≦Mo+W+V+Nb+Ta+Cu≦1%

1.3%≦Ti≦1.7%

0.05%≦Al≦0.25%

0.1%≦Mn≦0.3%

0%≦Si≦0.1% the balance being iron and impurities resulting from smelting.

3. The soft magnetic alloy as claimed in claim 1, further wherein:

C<0.01%

S<0.001%

P<0.01%.

4. The soft magnetic alloy as claimed in claim 1, wherein:

$50\% \leq Ni+Co \leq 52\%$ $0\% \leq Co \leq 3\%$ $3\% \leq Cr \leq 4\%$ $0\% \leq Mo+W+V+Nb+Ta+Cu \leq 0.5\%$ $1.3\% \leq Ti \leq 1.7\%$ $0.05\% \leq Al \leq 0.25\%$ $0.1\% \leq Mn \leq 0.3\%$ $0\% \leq Si \leq 0.1\%$.

5. A process for the manufacture of a strip or component made of the soft magnetic alloy as claimed in claim 1, wherein:

a strip or a component is manufactured from the alloy; and the strip or the component is annealed at between 1000° C. and 1175° C. for 2 to 6 hours and then tempered at a temperature of between 650° C. and 750° C. for 1 to 5 hours.

6. A relay comprising a magnetic circuit comprising a moving contact and a fixed armature, wherein at least one component comprises a soft magnetic alloy as claimed in claim 1.

7. An electric motor or generator comprising a magnetic circuit stator and a coil core, wherein at least one stator component and/or the coil core comprises a soft magnetic alloy as claimed in claim 1.

8. A synchro-resolver, comprising a soft magnetic alloy as claimed in claim 1.

9. A vibrating reed or membrane moved by an electromagnet, comprising a soft magnetic alloy as claimed in claim 1.

* * * * *